Figure 1:
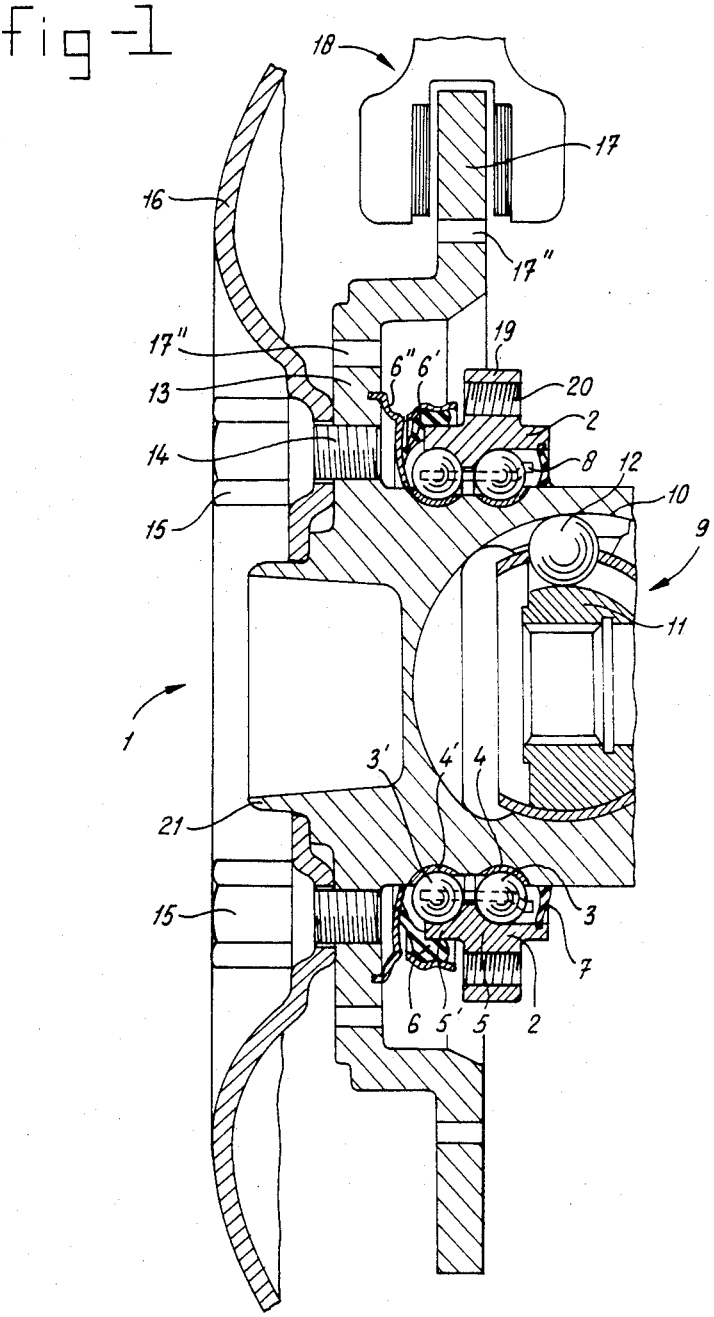

United States Patent [19]

Merkelbach

[11] Patent Number: 4,621,700
[45] Date of Patent: Nov. 11, 1986

[54] WHEEL BEARING

[75] Inventor: Boy Merkelbach, Utrecht, Netherlands

[73] Assignee: SKF Industrial Trading and Development Company B.V., Nieuwegein, Netherlands

[21] Appl. No.: 664,168

[22] Filed: Oct. 24, 1984

[30] Foreign Application Priority Data

Dec. 8, 1983 [NL] Netherlands .................. 8304240

[51] Int. Cl.[4] .................. B60K 17/00; F16D 3/22
[52] U.S. Cl. .................. 180/70.1; 180/254; 384/492; 464/139; 464/906
[58] Field of Search .................. 180/70.1, 252, 253, 180/254; 384/492, 497, 512; 464/139, 141, 906

[56] References Cited

U.S. PATENT DOCUMENTS

| 3,583,511 | 6/1971 | Asberg | 180/70.1 |
| 3,884,331 | 5/1975 | Asberg | 188/18 A |
| 4,293,171 | 10/1981 | Kakumoto et al. | 384/492 |
| 4,473,129 | 9/1984 | Guimbretiere | 464/906 |

Primary Examiner—John J. Love
Assistant Examiner—Kenneth R. Rice
Attorney, Agent, or Firm—Eugene R. Renz, Jr.

[57] ABSTRACT

Wheel bearing with a built-in homokinetic coupling. The wheel bearing comprises a generally annular inner part, an outer race and two rows of rolling elements located between the outside running surfaces formed on the outer race and the inside running surfaces applied to the inner part. The outer race is equipped with a radially extending flange for the attachment of the bearing. The annular inner part is equipped with a radially extending flange to which the hub of a wheel can be attached. The inner part forms at the same time one unit with the outer ring of the homokinetic coupling. The flange of the inner part is extended with a brake element which forms the part to be braked of a braking mechanism so that the inner part of the bearing, the carrier flange for the wheel, the brake element and the outer ring of the homokinetic coupling form one homogeneous unit. The inner raceway surfaces for the rolling elements are treated to a high grade bearing material and the inner part has an axial stub directed away from the homokinetic coupling and extending beyond the attachment flange to define a guide means for the hub of the wheel.

1 Claim, 2 Drawing Figures

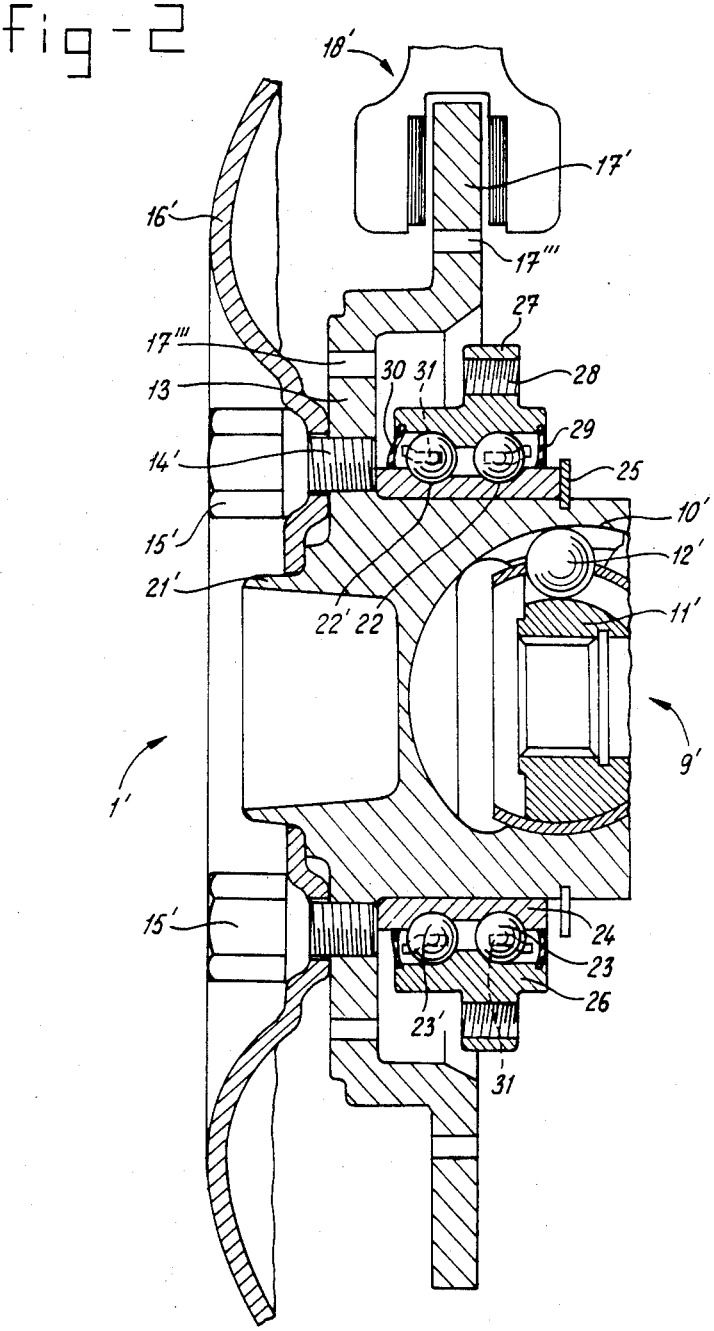

WHEEL BEARING

The invention concerns a wheel bearing with a built-in homokinetic coupling, including a generally annular inner part, an outer race and two rows of rolling elements located between the outside running surfaces formed on the outer race and the inside running surfaces applied to the inner part, whereby the outer race is equipped with a radially extending flange for the attachment of the bearing, and the annular inner part is equipped with a radially extending flange to which the hub of a wheel can be attached, and whereby this inner part forms at the same time one unit with the outer ring of the homokinetic coupling. A similar wheel bearing is known from the British Patent 1,416,989.

In a bearing of this type the homokinetic coupling forms in essence one unit with the wheel bearing, so that it is no longer necessary to attach the homokinetic coupling to the bearing, which is particularly difficult on account of the high level of precision required. However, all other wheel accessories, such as brake elements, still need to be attached separately.

The purpose of the invention is to produce a wheel bearing of the type mentioned, whereby the attachment of the separate components belonging to the wheel construction, and the mutual adjustment of these components, are reduced to a minimum.

This purpose is achieved by the fact that, in the wheel bearing according to the invention, the flange of the inner race has been extended with a brake element which forms the part to be braked of a braking mechanism, so that the generally annular inner part of the bearing, the carrier flange for the wheel, the brake element and the outer ring of the homokinetic coupling form one homogeneous unit.

Because the running surfaces for the rolling elements have to consist of a high-grade material in order to obtain a bearing with an acceptable lifespan, the whole inner part of the known bearing in which the inside running surfaces are formed in the outer circumferential surface of the inner part, consists of a high-grade material.

Thus, in the bearing according to the invention where also a brake element forms one unit with the inner part, this brake element, too, would have to consist of a high-grade material, which would make the entire wheel bearing relatively expensive.

Because the brake element itself does not have to consist of a high-grade material, the invention provides that, in a favorable manner, the inner part of the bearing is manufactured from a material which meets less high demands, and that the inside running surfaces formed in the outer circumferential face of the inner part undergo a treatment in such manner that a surface layer of a high-grade material is formed.

It is also possible, according to the invention, for the inside running surfaces for the rolling elements to be formed in a separate ring of a high-grade material, which is attached around the annular inner part. In this manner the inner part, together with the flange and the brake element with which it forms one unit, may also be manufactured from a material of lesser quality; in addition, this yields the advantage that, in case of bearing defects, the bearing can be replaced in a simple manner.

Due to the fact that, this way, the inner part may be manufactured from a relatively cheap material, the inner part may be equipped in a favorable manner with an axial stub, directed away from the homokinetic coupling and extending beyond the flange for attachment, in the form of a guiding element for the wheel rim.

It should be noted that, from the British Patent 1,454,398, a wheel bearing is known with two rows of rolling elements which are contained between an inner and an outer race, and whereby the inner race forms one unit with the flange for the attachment of a wheel and a brake element. However, no homokinetic coupling has been built into the wheel bearing, so that the inner race is simple in construction.

The invention is further described with reference to the models of execution shown in the drawing.

FIG. 1 shows an axial section of a wheel bearing according to the invention, and FIG. 2 shows an axial section of another model of execution of the wheel bearing according to the invention.

As shown in FIG. 1, the wheel bearing contains a generally annular inner part 1 and an outer race 2 and—located between these parts 1 and 2—two rows of rolling elements 3 which rest, on the one side, against the inside trajectories 4, 4' formed in the outer circumferential wall of the inner part 1 and, on the other side, against the running surfaces 5, 5' formed in the outer race 2. Furthermore, seals 6 and 7 have been applied, whereby seal 6 forms a seal with the lip-shaped endings 6' against an annular element 6'' attached to the flange 13. The rolling elements 3 are furthermore separated from one another by means of a flexible cage 8.

In a cavity of the inner part 1, a homokinetic coupling 9 is formed so that the extending part 10 of the inner part 1 forms the outer ring of this coupling. The homokinetic coupling 9 includes furthermore the inner ring 11 to be driven, and a number of driving balls 12, each of which is contained in channels in the outer ring 10 or the inner ring 11, respectively.

The inner part 1 is furthermore equipped with a radially extending flange 13, which has a number of openings 14 equipped with female threads, so that by means of the bolts 15 the hub 16 of a wheel can be attached to the flange 13. The flange 13 is extended outwardly with part 17 which forms the part to be braked of a braking mechanism 18 which, in the model of execution shown, is a disk-brake mechanism. The disk 17 is furthermore equipped with air gaps 17'' which serve to dissipate the heat generated during braking.

The outer race 2 is equipped with a radially extending flange 19 which has openings 20 for attaching the bearing.

The inner part 1 is furthermore equipped with an axially extending hollow stub 21 which serves to guide and align the wheel hub 16.

The model of execution shown in FIG. 1 includes the inner part 1 with stub 21, the outer ring 10, flange 13 and brake element 17, consisting of one homogeneous unit and manufactured from a lower-grade material than is required for the bearings themselves. However, the inner running surfaces 4, 4' have undergone a treatment so that in the area of these surfaces a layer of high-grade material has been formed. The inside running surfaces formed on the outer circumferential wall of the inner part 1 can, for example, be coated with a material of a higher grade which is subsequently subjected to a hardening and polishing process, so that at least this part of the entire unit will meet the demands placed upon a pivot bearing.

In the model of execution shown in FIG. 2, the components which correspond to the model of execution according to FIG. 1, are indicated with the same reference numbers, but with the addition of the prime symbol.

The model of execution according to FIG. 2 differs from the one according to FIG. 1 only in that the inner running surfaces 22, 22' for the rolling elements 23, 23' are formed in a separate inner race 24, which has been applied around the outer circumferential wall of the inner part 1' and fastened in place with the retaining ring 25. This inner race 24 is surrounded by an outer race 26 which is equipped with a radially extending flange 27 with openings 28 for coupling the unit to the wheel and steering mechanism suspension. In addition, there are seals 29, 30 between the outer race 26 and the inner race 24, and the rolling elements 23, 23' are contained in a cage 31. This way, an easily removable bearing part is obtained, so that the bearing can be replaced in a simple manner in case of bearing defects. Otherwise, the model of execution according to FIG. 2 corresponds to the one according to FIG. 1.

What is claimed is a:

1. Wheel bearing with a built-in homokinetic coupling, including a generally annular inner part, an outer race and two rows of rolling elements located between the outside running surfaces formed on the outer race and the inside running surfaces applied to the inner part, whereby the outer race is equipped with a radially extending flange for the attachment of the bearing, and the annular inner part is equipped with a radially extending flange to which the hub of a wheel can be attached, and whereby this inner part forms at the same time one unit with the outer ring of the homokinetic coupling characterized by the fact that the flange (13, 13') of the inner part (1, 1') is extended with a brake element (17, 17') which forms the part to be braked of a braking mechanism (18, 18'), so that the inner part (1, 1') of the bearing, the carrier flange (113, 13') for the wheel, the brake element (17, 17') and the outer ring (10, 10') of the homokinetic coupling (9, 9') form one homogeneous unit, the inner raceway surfaces for the rolling elements being treated to form a high grade bearing material and said inner part having an axial stub (21, 21') directed away from the homokinetic coupling (9, 9') and extending beyond the attachment flange (13, 13') to define a guide means for the hub (16, 16') of the wheel.

* * * * *